United States Patent
Herczfeld et al.

[15] 3,704,706
[45] Dec. 5, 1972

[54] HEART RATE AND RESPIRATORY MONITOR

[72] Inventors: Bonita Falkner Herczfeld; Peter R. Herczfeld, both of Philadelphia, Pa.; Richard D. Klafter, Willingboro, N.J.

[73] Assignee: Drexel University, Philadelphia, Pa.

[22] Filed: Oct. 23, 1969

[21] Appl. No.: 868,823

[52] U.S. Cl. ........... 128/2 R, 128/2.05 T, 128/2.05 P, 356/41
[51] Int. Cl. ........................................... A61b 5/02
[58] Field of Search ....128/2, 2.05 T, 2.05 V, 2.05 P, 128/2.05 F; 356/39–42

[56] References Cited

UNITED STATES PATENTS

| | | | |
|---|---|---|---|
| 2,640,389 | 6/1953 | Liston | 128/2 R |
| 3,103,214 | 9/1963 | Smith | 128/2.05 P |
| 3,123,066 | 3/1964 | Brumley | 128/2 R |
| 3,139,086 | 6/1964 | Botsch et al. | 128/2.05 P |
| 3,152,587 | 10/1964 | Ullrich et al. | 128/2 R |
| 3,167,658 | 1/1965 | Richter | 128/2.05 P |
| 3,228,391 | 1/1966 | Fitter et al. | 128/2.05 T |
| 3,230,951 | 1/1966 | Teschner | 128/2.05 P |
| 3,511,227 | 5/1970 | Johnson | 128/2.05 F |

FOREIGN PATENTS OR APPLICATIONS

| | | | |
|---|---|---|---|
| 987,504 | 3/1965 | Great Britain | 128/2.05 P |

*Primary Examiner*—Richard A. Gaudet
*Assistant Examiner*—Kyle L. Howell
*Attorney*—Paul and Paul

[57] ABSTRACT

Apparatus for detection of pulse repetition rate and oxygenation of blood flow, comprising a solid state probe having a narrow bandwidth light source housed to direct light upon a patient's finger and a photodetector housed for receiving reflected light from such finger, the output of the detector being connected to electronic circuitry for detecting pulse repetition rate of blood flow and for detecting signal level representative of the degree of oxygenation of the patient's blood. The use of a low power narrow bandwidth light source with a red emission characteristic permits precise detection of the degree of oxygenation of the blood.

2 Claims, 4 Drawing Figures

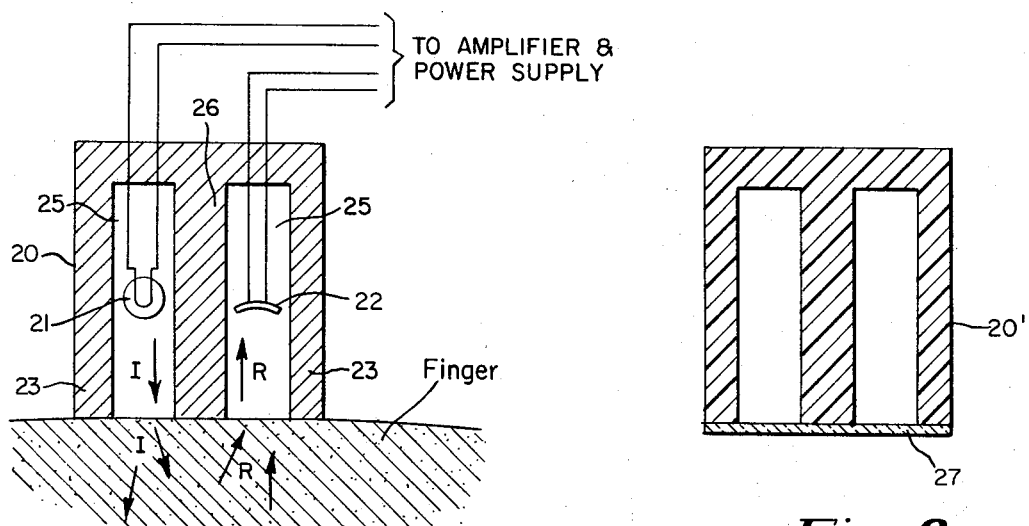
Fig. 1
Fig. 2
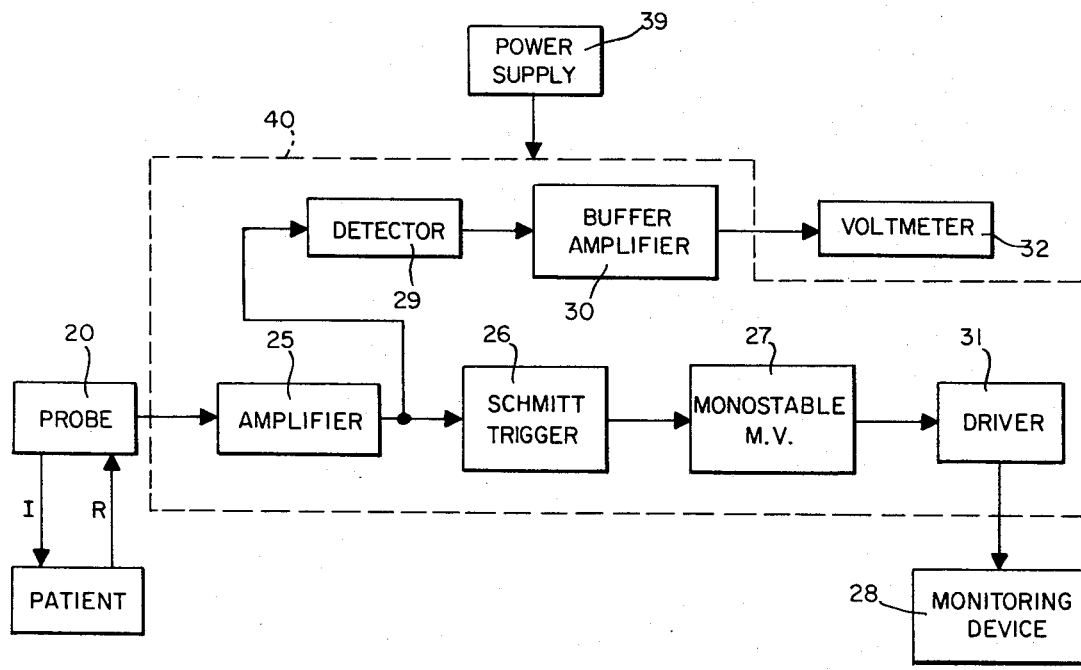
Fig. 3
INVENTORS.
BONITA FALKNER HERCZFELD
PETER R. HERCZFELD
RICHARD D. KLAFTER
BY Paul & Paul
ATTORNEYS.

NORMAL PROBE OUTPUT VOLTAGE

RESPIRATORY DISTRESS

SCHMITT TRIGGER

MULTIVIBRATOR

HEART RATE AND RESPIRATORY MONITOR

BACKGROUND OF THE INVENTION

A. Field of the Invention

This invention lies in the field of heart rate monitors and, more particularly, solid state monitors for detection of peripheral flow and oxygenation of blood in a newborn infant patient.

B. Description of the Prior Art

The problem of accurately monitoring the heartbeat and of obtaining information regarding the flow of oxygenated blood in a newborn infant has long resisted the development of an economical instrument. The severity of the problem is based on the medical consideration that an infant, and particularly a premature infant, when undergoing an exchange blood transfusion, sometimes suffers cardiac arrest which, if undetected for a relatively short period of time, may cause permanent brain damage or death. Further, physicians are vitally interested in obtaining information relating to respiratory arrest and the degree of oxygenation of the blood being circulated throughout the body during and after an exchange transfusion. It is of particular importance to have information which discloses a partial cardiac arrest or a partial respiratory arrest, so that the physician can take swift action to alleviate and correct the situation. There is thus a requirement for continuous monitoring of both pulse repetition rate, a change in which often precedes cardiac arrest, and the level of oxygen in the blood, which is an indication of respiratory distress.

The prior art shows a number of heart monitoring devices. However, most of these devices are designed for clinical use on adults and are generally not suitable for use with newborn infants. Particularly, devices utilizing electrodes generally require that the electrodes be of a sufficient size to pick up the extremely small biopotential signals which are monitored, such large electrode sizes being unworkable for newborn infants. Furthermore, commercially available heart monitoring devices are extremely expensive, and provide no information about the flow of oxygenated blood.

Apparatus for the measurement of peripheral pulsations has a number of distinct advantages over the electrocardiogram and other similar devices. First, it is known that it is possible for electrical activity of the heart to persist after the heart has actually stopped beating. Thus, a monitor designed to detect biopotentials could be late in detecting any cardiac arrest. Further, it is extremely difficult to place electrodes on infants in such a way as to avoid extraneous noise pickup. And, perhaps most importantly, a monitor that only senses biopotentials cannot detect respiratory distress.

Digital monitors, or transducers, for detecting peripheral pulsations, and utilizing a light source in combination with a detector, have been shown in the art. More particularly, the prior art discloses a digital transducer comprising a light source in combination with a photoelectric cell, with a red filter placed over the photoelectric cell. Since the photocell is responsive to light in the red region of the spectrum, arterial pulsations which drive blood into the digit result in an increased redness and increased photocell response, thus giving an indication of the pulse repetition rate. However, a bulb and filter combination is inefficient, most of the radiated energy being outside of the red. Only by inclusion of a prohibitively expensive optical filter could such a light and filter combination produce a narrow band width on the order of that provided by a laser. In addition to being more cumbersome, the device necessarily has a heating problem, which makes it particularly undesirable for use with infants. Further, the device detects only volume of blood flow, and cannot distinguish between blood volume and degree of oxygenation.

SUMMARY OF THE INVENTION

The primary object of this invention is to provide apparatus for the detection of oxygenated blood flow which is simple, efficient, lightweight, inexpensive and effective for the purpose and which overcomes the disadvantages of the prior art.

It is a further object of this invention to provide a heart rate monitor comprising a solid state optical probe which is suitable for use on premature infants, and which senses peripheral pulsations of the heart.

It is a further object of this invention to provide apparatus which monitors both heart pulse rate and oxygenation of blood flow.

Accordingly, this invention provides apparatus comprising a solid state laser as a source of light in combination with a solid state photodetector, forming an optical probe suitable for sensing peripheral pulsations of the heart. The solid state laser is a very small and extremely efficient light source emitting microwatts of power in a narrow band width having peak emission occurring in the red range of the optical spectrum. The laser directs a low energy beam of light at the capillaries of a finger, the blood flowing within reflecting incident red light which is detected by a photodetector housed adjacent to the laser and having a response curve suitable for detection throughout the emission spectrum of the laser. The electrical output of the probe is transmitted to processing apparatus having pulse detection circuitry to determine the pulse repetition rate, as well as DC level detection circuitry to determine the relative oxygen content of the blood.

BRIEF DESCRIPTION OF THE DRAWINGS

FIG. 1 shows a schematic diagram of the probe housing and its elements in relation to a patient's finger.

FIG. 2 shows a schematic diagram of an alternate construction of the probe housing.

FIG. 3 shows a block diagram of electronic processing circuitry which is connected to the probe.

DESCRIPTION OF THE PREFERRED EMBODIMENTS

Figure 4A:
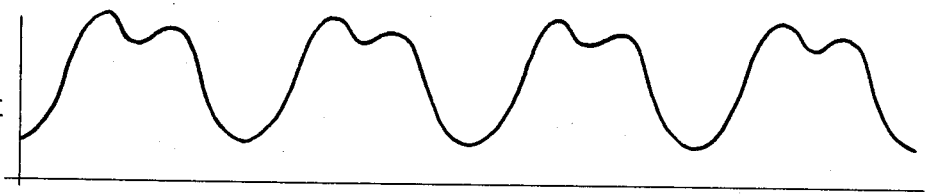
FIG. 4 shows a representation of waveforms produced by the probe and electronic processing circuitry.

Referring now to the drawings, FIG. 1 shows a schematic diagram of the probe and its elements. The probe 20 is placed on the patient's finger by conventional strapping or tape and aligned such that the light source 21 directs incident light, indicated by arrows marked "I," at the patient's finger. The detector 22 is placed adjacent to light source 21 and disposed in order to collect reflected light, indicated by arrows marked "R,"

from the patient's finger. The light source 21 and photodetector 22, combined with housing 23, form the probe 20, which has typical overall dimensions of ⅛ inch × ¼ inch × ¼ inch. The light source 21 is suitably a gallium arsenide solid state laser which itself is one-tenth inch in diameter and 0.15 inch in length, having typically 25 microwatts of power being emitted in a narrow band width with the peak emission occurring at 6,700 angstrom, i.e., in the red range of the color spectrum. Such a typical gallium arsenide laser is commercially available. See, for instance, Monsanto model MV10A. The photodetector 22 is required to have high sensitivity through the frequencies of the emission spectrum of the laser. A suitable photodetector is the Motorola MRD210 50 volt NPN silicon photodetector. This detector is approximately 0.06 inch in diameter and a maximum of 0.118 inch in height, which dimensions permit incorporation into the ⅛ inch × ¼ inch × ¼ inch probe device. A photodetector having frequency selectivity matching the laser characteristics would further increase the selectivity of the probe.

The probe housing 23 may be fabricated from a piece of metal, suitably brass, having parallel recesses or holes 25 drilled within it to accommodate the laser and photodetector respectively, the holes being oriented perpendicular to the probe's surface which is placed against the finger. Between recesses 25 is an insulating member 26 which optically isolates the recesses, thereby optically isolating the laser and photodetector. Alternately, the probe housing may be made from an epitaxial plastic, as shown in FIG. 2. A front portion 27 of a clear nonhardening plastic may be added, thereby encapsulating the laser and photodetector without significantly impeding light transmission. A power supply 39 provides power for the laser and the photodetector, as well as the electronic circuitry described hereinbelow.

Figure 4B:
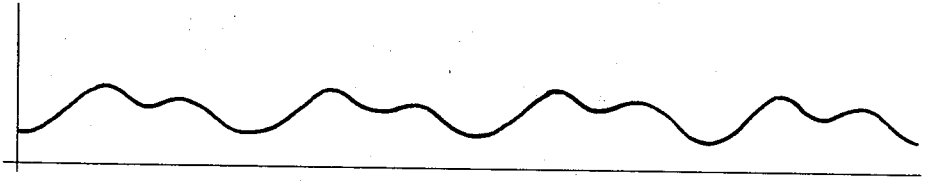

In operation, the probe is placed upon the patient's finger such that blood which is flowing in the capillaries of the finger reflects incident red light. The intensity of the reflected light is proportional both to the amount of blood flowing in the finger and to the freshness of the blood, i.e., the degree to which it is oxygenated. For each heartbeat, fresh blood is pumped into the capillaries, thereby causing a periodic increase and decrease in the reflected light intensity. Under normal conditions then, a periodic waveform such as shown in FIG. 4a will be detected, which waveform represents both volume and color of the circulating blood. The waveform has an AC component corresponding to the heart pulsations, and a DC component which will be directly proportional to the redness, or oxygenation, of the blood. In the event of partial cardiac arrest, the pulsations vary in frequency, which condition can be easily detected. When a respiratory distress occurs, the heart continues to pump blood, but it is relatively unoxygenated blood with a characteristic bluish hue. Since the probe is relatively insensitive in the blue region of the light spectrum, such a respiratory distress is immediately manifested by a probe signal of diminished amplitude, as shown in FIG. 4b. By contrast, in the partial cardiac arrest condition, the pulse repetition rate will change, while the amplitude and DC level will remain essentially the same. To distinguish the respiratory distress condition from the partial cardiac arrest condition, the DC component of the signal, or the peak-to-peak value, is monitored. Thus, by distinguishing pulse repetition rate and DC level, the two cases can be separately diagnosed.

Figure 4C:
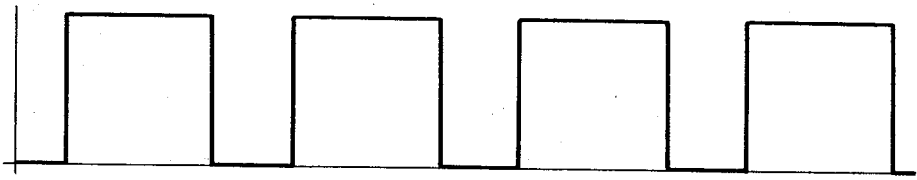
Figure 4D:
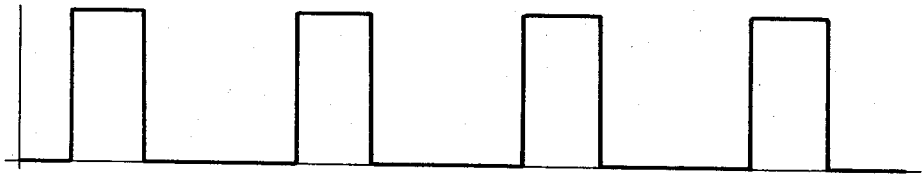

Referring now to FIG. 3, a block diagram of the heart rate and respiratory monitor is shown. The signal developed by the probe 20, as shown in FIG. 4a, is coupled into electronic circuitry 40 for information processing. The signal is first fed through a conventional solid state DC amplifier 25 which amplifies the total signal. The output of amplifier 25 is parallel coupled to a conventional Schmitt Trigger circuit 26 and to a detector 29. The Schmitt Trigger 26 is a bistable electronic device which, when driven by the pulsating signal, will switch between two stable states, thus producing a squarewave output as shown in FIG. 4c. Such squarewave may suitably be differentiated and applied to a conventional mono-stable multivibrator 27, which multivibrator will produce a pulse train output having suitable pulse widths, and having a pulse repetition rate equal to that of the probe waveform. Such a mono-stable output is shown in FIG. 4d. This output, then, can be coupled to a conventional driver circuit 31, such as an emitter follower, which in turn drives a suitable monitoring device 28, such as a beep tone generator or oscillograph.

Still referring to FIG. 3, the output of amplifier 25 is also fed into a detector 29, suitably a conventional DC detector. The output of detector 29 is coupled, preferably through a buffer amplifier 30, to a suitable volt meter 32 which would indicate the magnitude of the detected DC voltage. The volt meter 32 can be suitably equipped with a reference needle, which needle can be set at a lower limit, such that when the DC level drops to such lower limit, the meter would sound an alarm signal, notifying a physician. By checking the pulse rate output, the physician could immediately determine whether the drop in DC level was due to a respiratory or cardiac cause.

It is to be understood that detector 29 could, alternately, be a peak-to-peak detector of conventional circuitry, and be connected to a peak-to-peak volt meter which would indicate the magnitude of the detected voltage pulses in the signal from probe 20. Either the DC level or the peak-to- peak information, when compared with the pulse repetition rate, would be sufficient to enable the physician to distinguish between cardiac arrest and respiratory distress.

From the foregoing, it is seen that this invention provides an extremely efficient and suitably small device for monitoring blood flow characteristics of an infant. The choice of a laser which produces approximately 25 microwatts makes possible a very cool and efficient device. Further, by using a narrow beam laser, it is possible to produce a device which is very sensitive to changes in blood color. By contrast, apparatus utilizing white light in combination with a red filter, in addition to being inefficient and generating heat which would be prohibitive in clinical uses with infants, produces a relatively broad range of red light. Consequently, relatively large changes in oxygen content must take place before detection by a white light and filter combination, whereas extremely small changes can be detected with the frequency selective laser probe of this invention.

It is to be noted that equivalent narrow beam light sources including light-emitting diodes, whether the light is coherent or not may be utilized in place of lasers in the practice of this invention. It is further noted that while specific electronic circuitry for processing the probe signal has been discussed in this specification, a wide variety of pulse repetition rate and level detection circuits can be used.

We claim:

1. Heart rate and respiratory monitor apparatus for detecting pulse repetition rate and oxygenation of blood flow in a patient, comprising:
   a. a probe housing having first and second light transmitting faces;
   b. a low power solid state laser red light source, having narrow bandwidth emission characteristics, positioned in said probe housing to emit red light through said first face;
   c. semiconductor photodetector means for detecting red light reflected thereon, said photodetector means positioned in said housing to receive light through said second face of said housing, such that when said faces of said probe housing are positioned contiguous to a periphery of a patient, incident light from said red light source is reflected from such periphery and received by said photodetector means;
   d. electronic processing means connected to said photodetector means having pulse repetition rate circuitry and first output means coupled thereto for monitoring said patient's pulse repetition rate, and signal level detection circuitry and second output means coupled thereto for monitoring the degree of oxygenation of said patient's blood; and
   e. a power source connected to and supplying energy to said red light source, said photodetector means, and said electronic processing means.

2. Heart rate and respiratory apparatus for detecting the pulse repetition rate and degree of oxygenation of blood flowing in a peripheral portion of a patient, comprising:
   a. narrow bandwidth red light means for transmitting incident red light upon said peripheral portion and detecting red light reflected therefrom;
   b. a probe housing means for housing said red light means such that, when positioned contiguous to said periphery, some of said incident light is reflected from the blood flowing in said periphery and received by said reflecting means; and
   c. electronic processing means connected to said detecting means for transforming said reflected red light into an electrical signal representing said reflected red light, and including pulse repetition rate circuitry for monitoring said patient's pulse repetition rate, and signal level detection circuitry for monitoring the degree of oxygenation of said patient's blood, said red light means including a narrow bandwidth solid state laser mounted within said probe housing means to direct incident red light to said periphery, and a semiconductor photodetector mounted in said probe housing means to receive red light reflected from said periphery.

* * * * *